United States Patent [19]

Kennedy et al.

[11] 3,869,656
[45] Mar. 4, 1975

[54] CIRCUIT FOR MODIFYING A TRAIN OF PULSES

[75] Inventors: Daniel W. Kennedy, Boston; Walter R. Woodward, Carlisle, both of Mass.

[73] Assignee: USM Corporation, Boston, Mass.

[22] Filed: Aug. 8, 1972

[21] Appl. No.: 278,742

[52] U.S. Cl............... 318/696, 318/415, 328/120, 318/415
[51] Int. Cl. ........................................... G05b 19/40
[58] Field of Search.................. 318/415, 696, 685; 328/120

[56] References Cited
UNITED STATES PATENTS

| | | | |
|---|---|---|---|
| 3,328,658 | 6/1967 | Thompson | 318/696 |
| 3,374,410 | 3/1968 | Cronquist et al. | 318/685 |
| 3,411,058 | 11/1968 | Madsen et al. | 318/685 |
| 3,475,667 | 10/1969 | Newell | 318/696 |
| 3,579,279 | 5/1971 | Inabu et al. | 318/685 |
| 3,593,097 | 7/1971 | Gebelein | 318/696 |
| 3,628,119 | 12/1971 | Abraham | 318/685 |
| 3,636,429 | 1/1972 | Jakubowskie et al. | 318/696 |
| 3,694,725 | 9/1972 | Abraham et al. | 318/685 |

Primary Examiner—G. R. Simmons
Attorney, Agent, or Firm—Ralph D. Gelling; Vincent A. White; Richard B. Megley

[57] ABSTRACT

A digital circuit for modifying a train of a finite number of pulses has, in a most direct approach, means for deleting selected pulses from the initial pulses of the train and from the final pulses of the train. The circuit has particular utility in driving stepping motors.

1 Claim, 2 Drawing Figures

CIRCUIT FOR MODIFYING A TRAIN OF PULSES

BACKGROUND OF THE INVENTION

Many modern technological devices make use of a series or train of pulses. Most often, the pulses are electrical, but may also be fluid, light or other media appropriate for the device in which they are used. Pulses are often thought of as digital signals and are thus conveniently employed in many digital devices.

An example of a digital device employing trains of pulses is a stepping motor; such motors will be used to illustrate the utility of the instant invention. Stepping motors are generally similar to other motors with the important exception that movement of the motor is directly proportional to the number of pulses in a train appropriately supplied to the motor. An example of a particular type of stepping motor responsive to electrical pulses is shown in U.S. Pat. No. 2,906,143 issued Sept. 29, 1959 in the name of C. W. Musser and an example of a similar type of stepping motor responsive to fluid pulses is shown in U.S. Pat. No. 3,088,333 issued May 7, 1963, also in the name of C. W. Musser.

The stepping motors illustrated in the above recited patents, in common with all other stepping motors, have limited inertia driving capabilities usually described as torque-speed characteristics for rotary motors such as those illustrated in the patents. A series of pulses applied too quickly to the motor will attempt to accelerate the motor beyond its inertia driving capability with the result that correspondence between the number of pulses and the extent of movement of the motor will be lost. Often, there is an actual torque reversal in which pulses applied after exceeding the inertia driving capability of the motor effectively try to drive the motor in the opposite direction from that intended, thereby slowing the acceleration of the motor. A similar problem exists when it is desired to stop a stepping motor and the inertia stopping capabilities of the motor are exceeded.

One significant advantage of stepping motors over conventional motors results from the correspondence between number of pulses applied to the motor and the movement of the motor while, in addition, maximum utilization of a stepping motor often requires that acceleration and deceleration be as rapid as possible. For example, where a stepping motor is to be used in a positioning system, the loss of correspondence between the pulses and motor movement results in inaccurate positioning; similarly, slow acceleration and deceleration result in slow positioning.

Several solutions to these problems have been tried. These solutions generally involve gradually increasing and decreasing the pulse repetition rate or frequency of a train of pulses to and from the maximum useful rate, an operation commonly called ramping. One known solution uses an electrical voltage signal which may be gradually increased or decreased to provide an analog control for the repetition rate of pulses during acceleration and deceleration of a stepping motor. Its analog operation destroys certain advantages of the otherwise digitally operated stepping motor. Another known solution deletes selected pulses including and after the second pulse of the initial pulses of a train, stores the number of pulses deleted in memory, generates in an independent pulse generator or oscillator operating at a frequency appropriate for decelerating the stepping motor the remembered number of deleted initial pulses and adds the generated pulses to those supplied to the motor after those of the train have ended. In addition to deleting the second pulse, a problem later to be explained, the solution requires an independent pulse generator and adjustment of the independent pulse generator to the appropriate frequency.

SUMMARY OF THE INVENTION

Accordingly, it is an object of the invention to provide a digital circuit, absent unnecessary pulse generators and adjustments for modifying a train of pulses.

To this end the invention provides a digital circuit for modifying a train of pulses. At least three different approaches to the operation of the circuit of the invention are possible. In a first, most direct approach, the circuit has means for deleting selected pulses from the initial and final pulses of the train. Intermediate pulses, if any, are unmodified. Obviously, the number of pulses in the train will exceed the number of pulses to be used so that, after deleting the pulses, an appropriate number of pulses will remain for use.

In a second approach, the same circuit has means for deleting a selected pulse from a sequence of pulses forming the initial pulses generated for the train and means for adding a pulse to final pulses of the train in a place in a sequence of pulse places corresponding to the places of pulses in the initial sequence of the train. The means for adding pulses obtains the pulses from the oscillator providing the pulses of the train and not from an independent pulse generator. In the preferred embodiment, the place in the final pulse sequence in which a pulse is added is the same place from which a pulse was deleted from the initial sequence.

In a third approach, the circuit has means for forming an initial and final sequence of pulses of a train by selecting for the sequence a number of pulses from the train and a number of pulses from a second train. The trains may be derived from the same pulse generator. Obviously, the initial and final sequence of pulses will only be modified from those comprising the first train if the repetition rate of the pulses of the second train is different from those forming the first train.

It will be appreciated that each of these three approaches describes the same operation of the same circuit and differs from each other only in viewpoint. Where, in the further description of the invention, the particular approach employed is not evident, reference to one of the three approaches will be made.

DESCRIPTION OF THE DRAWINGS

A preferred embodiment which is intended to be illustrative of the invention and not a limitation will now be described with reference to the drawings in which.

DESCRIPTION OF THE PREFERRED EMBODIMENTS

Figures 1, 2:
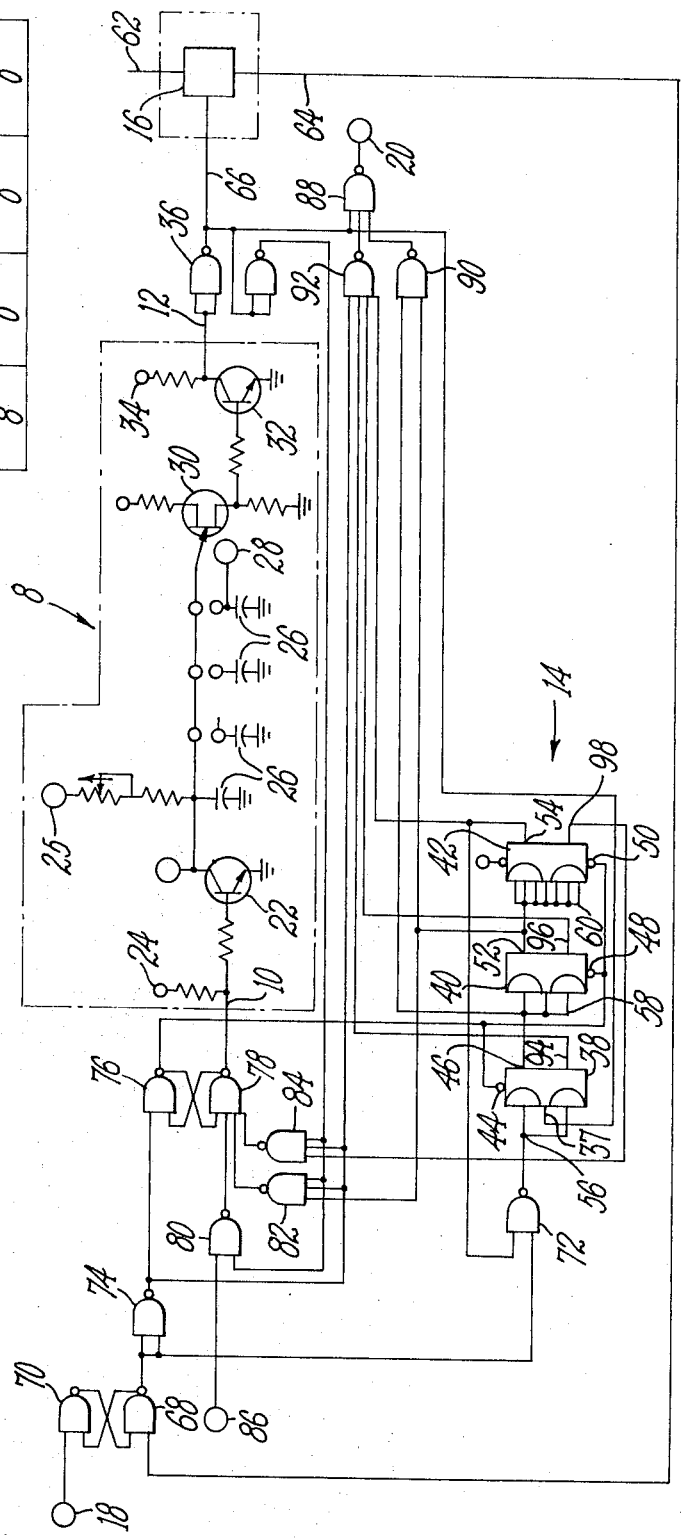
FIG. 1 is a schematic of the preferred embodiment.
FIG. 2 is a state diagram for a counter portion of the circuit in FIG. 1.

A portion of the circuit shown in FIG. 1 forms an oscillator or pulse generator generally at 8 which may be of any convenient design. The oscillator receives an input signal at port 10 and, in response, provides a train of pulses at output port 12. The remaining circuit comprises NAND gates and a series of flipflops connected as a counter generally at 14. A second counter 16 keeps track of the number of pulses generated. Briefly, the circuit is operated by setting the counter 16 to a finite number of pulses desired for a train. An appropriate start signal is provided at a start terminal 18 which signals the oscillator to generate the train of pulses. The NAND gates delete or blank a selected pulse from the initial pulses of the train, the remaining pulses of which appear at an output terminal 20. The oscillator continues to produce pulses until the counter 16, which counts each pulse produced by the oscillator, reaches the number of pulses desired for the train. The counter 16 then provides a signal to the circuit to terminate oscillator generation of pulses. However, the number of pulses which have appeared at the output terminal 20 is less than the number of pulses desired for the train by the number of initial pulses deleted. Accordingly, the NAND gates permit the oscillator to continue pulse generation until an additional pulse has been generated by the oscillator and transmitted to the output terminal 20. The oscillator is then disabled until the circuit is reactivated to generate another train of pulses.

The oscillator generally at 8 is a relaxation oscillator of the blocking type employing a unijunction transistor but may be of any other design suitable for generating pulses for driving the desired load. In the oscillator, a first transistor 22 is normally biased for conduction by a positive voltage applied to terminal 24. While transistor 22 conducts, a positive voltage from terminal 25 is substantially grounded through the collector-emitter juncture of the transistor and no charge is collected on timing capacitors 26, at least one of which is connected to the collector of transistor 22 by selector switch 28.

A low voltage signal applied to the input port 10 of the oscillator causes transistor 22 to cease conduction and a charge to collect on the connected capacitors 26. Selection among the capacitors 26 by switch 28 varies the capacitance and hence the time required to charge the capacitors; the switch thereby controls the time between successive pulses or the pulse repetition rate or frequency of the oscillator. The capacitors 26 are also connected to the emitter of a unijunction transistor 30 which has an appropriate voltage across its bases. When sufficient charge is stored in the capacitors 26, the unijunction transistor conducts to provide a conduction bias voltage to a second transistor 32. The collector of the transistor 32 is connected to a positive voltage terminal 34 and to the output port 12 of the oscillator so that conduction of transistor 32 grounds the positive voltage on the output terminal each time the unijunction transistor causes it to conduct. A train of positive ongoing pulses is thus produced at the output of the oscillator.

The output of the oscillator is connected to both inputs of NAND gate 36. With both inputs connected to a common terminal, NAND gate 36 functions as an inverter; however, its principal utility is to provide pulse shaping and high output impedance characteristics to the oscillator. Similar output pulse shaping and impedence increasing devices may be provided, as desired, between other components of the circuit shown in FIG. 1.

The output pulse train from NAND gate 36 is connected to the clock input port 37 of a J-K type flipflop 38 forming part of the counter generally at 14. Additional, similar flipflops 40 and 42 are connected in series with flipflop 38 to complete the counter 14. Reset port 44 of the flipflop 38 is provided with a signal to set the flipflop to its nominal "1" state indicated by a high signal level on its "1" output terminal 46. The same signal is provided to inverse reset ports 48 and 50 of the flipflops 40 and 42, respectively, so that the flipflops 40 and 42 are set to their nominal "0" condition with low signal levels on their "1" output ports 52 and 54, respectively. These initial states of each of the flipflops 38, 40 and 42 are denominated the "1" state of the counter 14 and indicated along with successive states of the counter in the state table of FIG. 2.

The J and K enable input ports of each flipflop 38, 40 and 42 are connected together to form input ports 56, 58 and 60, respectively, for each of the flipflops. The enabled port 56 receives an input signal while the enable ports 58 and 60 are connected to the "1" output ports 46 and 52 of the preceding flipflops. When an appropriate high logic level signal is provided to the enable port 56 and the pulses supplied to the clock input 37 from the NAND gate 36 make a high to low level transition, the flipflop 38 with complement to a low level output on its "1" port 46. The resulting high to low level transition of the signal on the connected input port 58 will complement the flipflops 40 to provide a high level output on its "1" output port 52. The high level signal on the port 52 will enable the connected flipflop 42 but will not complement it both because it was not previously enabled and because the signal transition was low to high level. Successive pulses will successively complement those of the flipflops of counter 14 which are enabled resulting in the table of states of the counter 14 shown in FIG. 2; the table will be recognized as that of a binary counter.

The counter 16 may be of a construction similar to that of the counter generally at 14 or of other known designs. Were it to be made similar to the counter 14, a data port 62 would be appropriately connected to reset ports of flipflops forming the counter to set the counter to a desired initial number and an output port 64 would be appropriately connected to a selected "1" output port of a selected flipflop to provide a signal when a desired number of pulses had been provided to an input port 66 connected to the clock and enable ports of the first flipflop of the counter series. Of course, appropriate gates may be provided between the counter and the output port 64 to broaden the potential selection of output signal generating numbers in the counter. For purposes of understanding the circuit, it is sufficient that a high logic level signal be provided at the output port 64 when the number of pulses appearing at the input port 66 equals the preselected number provided to the counter at data port 62.

The normally low signal from output port 64 of the counter 16 is one of two inputs to a NAND gate 68 the other input and output ports of which are cross-over-connected to the output and an input port, respectively, of another NAND gate 70 to form a flipflop. The other input port of gate 70 is connected to the start terminal 18 to which an appropriate signal may be applied to initiate operation of the circuit. A momentary high signal level on the terminal 18 will produce a high signal level from the output port of gate 68 until a high signal level is provided to the gate from the counter 16. Flipflop gates 68 and 70 will then complement to provide a low signal level from the output of gate 68.

The high initial output from gate 68 provides a low, "run" signal to additional NAND gates 72 and 74. Gate 72 receives a second input from the "1" port of flipflop 42 which is, as seen in FIG. 2, initially low. The resulting high output level from gate 72 is fed to the enable port 56 of flipflop 38 to initially enable this flipflop of counter 14. The high level signal from gate 68 is applied to both input ports of gate 74 which, accordingly, functions as an inverter. The resulting normally low output signal is fed to NAND gate 76. The gate 76 is coupled with NAND gate 78 as a flipflop. The resulting, normally high output of gate 76 supplies the reset signal to the reset ports of the flipflops 38, 40 and 42 in the counter 14. The normally low output signal of gate 78 is supplied to the input port 10 of the oscillator to enable oscillator operation.

The gate 78 receives additional input signals from NAND gates 80, 82 and 84. Should any of these additional gates provide a low level signal to gate 78, the flipflop gates 76 and 78 will complement to provide a high level output from gate 78. The high signal from gate 78 is applied to the input port 10 of the oscillator which, as explained, disables oscillator operation. Accordingly, any of three low level signals will be effective to discontinue circuit operation.

The most direct low level signal for discontinuing circuit operation is provided from gate 80 which receives, as inputs, pulses from the oscillator and a signal from a stop terminal 86. A high level signal on the stop terminal produces a low level output from gate 80 and a high level output from gate 78 to disable the oscillator at the completion of any pulse then being produced by the oscillator.

Gates 82 and 84 each have three inputs, each of which must be high to produce a low level output. Each of the gates receives its input signals from the oscillator, the counter 14 and the counter 16. In general, the counter 16 produces a high level signal as its input two gates 82 and 84 when the number of pulses called for at the data port 62 have been produced by the oscillator. However, only pulses selected by additional NAND gates 88, 90 and 92 will have appeared at the output terminal 20. Accordingly, the counter 14 signals the gates 82 and 84 to terminate pulse generation only after an additional number of pulses have been produced by the oscillator and transmitted to the output terminal 20 sufficient to make the total number of pulses at the terminal 20 correspond with the desired number of pulses initially set in the counter 16. Particularly, it is desired to have the final pulses appear in the place in the pulse sequence from which initial pulses have been deleted.

For such operation, a signal is provided at the start terminal 18 which sets the counter 14 to its one state and initiates operation of the oscillator. The "1" output ports 46 and 52 in the counter 14 provide a high and low signal, respectively, to the gate 90 which, in turn, provides a high signal to the gate 88. Similarly, the zero output ports 94 and 96 and the one output port 54 in the counter 14 each provides a low output signal to the input ports of gate 92. A remaining input port of gate 92 is connected to the gate 74 which, after initially providing a low signal in response to the start signal at terminal 18, provides a high signal during operation of the circuit. Accordingly, the gate 92 provides a high signal to gate 88 which thereupon transmits the first pulse to output port 20.

The first pulse also arrives at the clock input of the first flipflop 38 in the counter 14 to complement the flipflops of the counter to the two state of the counter. Use of the state table of FIG. 2 will show that the inputs to each of the gates 90 and 92 remain mixed high and low with resulting high outputs to the gate 88. A second pulse is then generated by the oscillator and transmitted to the output 20 through the enabled gate 88 which at the same time complements the counter 14 to its three state. As shown in FIG. 2, the output of the one ports 46 and 52 in the counter 14 are now each high, thereby providing a low output signal from gate 90 into gate 88. As a third pulse is produced by the oscillator, it will be blanked or deleted from the train of low level pulses from the gate 88 to the output terminal 20 since the gate 88 output will be held high by the low signal from gate 90.

However, the third pulse is also transmitted to the counter 14 and complements the counter to its four state. A high level signal then appears at port 54 which, together with the high signal from gate 68, produces a low level signal from gate 72 on the port 56 to disable the flipflop 38. At the same time the signals on the ports 46 and 52 go low and the gate 90 output again goes high to permit the fourth and successive pulses to appear at the output terminal 20. With the counter 14 thus disabled, as many pulses as desired may be produced by the oscillator, each of which will be transmitted to the output terminal 20.

When the counter 16 reaches the number of pulses initially selected through the data port 62, the counter 16 produces a high final signal which complements the flipflop gates 68 and 70 which, in turn, provide a low signal to gate 72. Gate 72 then again provides a high level signal to the enabling port 56 of flipflop 38 which once again enables the counter 14. However, flipflop 38 will not complement on this pulse because it was not enabled prior to the pulse.

The low signal from gate 68 is also provided to gate 74 which provides a high signal to gates 76, 82 and 84. Gates 82 and 84, however, continue to receive low level signals from the ports 52 and 98 respectively and, accordingly, provide continued high level output signals to the gate 78. The high level output signal from gate 74 is also provided to gate 92 which, with the counter 14 in its four state thereupon receives all high level signals as may be verified by reference to FIG. 2. Gate 92 thereupon provides a low level signal to gate 88 which will blank or delete the pulse which triggered the high final signal from counter 16. Such self-blanking is possible because gate 88 produces pulses on the trailing edge of those from gate 36 while the counter 16 responds to the leading edge. Because the pulse which enabled gate 72 did not complement the flipflop 38, the first pulse from the oscillator after this pulse will also be blanked from the output terminal 20. However, it will complement the flipflops in the counter 14. The counter 14 thus achieves its five state which re-enables the gate 92.

The second pulse after activation of the counter 16 then carries through to the output terminal 20 while at the same time complementing the counter 14 to its sixth state. In the sixth state a high level signal is provided from port 52 to gate 82 which produces a low level signal to the gate 78. The gate 78 then produces a high level signal which appears at the input port 10 of the oscillator and causes the oscillator to cease producing pulses. The two penultimate pulses have thus been deleted.

Where the counter 16 is set for one pulse, the first 1-pulse will produce a high final signal from the counter 16 and a corresponding high input signal to gate 84. Gate 84 additionally receives a high input signal from port 98 in the counter 14 and from the trailing edge of the first pulse. The corresponding low output signal from gate 84 produces a high output signal from gate 78 which disables the oscillator from the production of further pulses.

Where the counter 16 is set for two pulses, the leading edge of the second pulse will produce a final high output signal from the counter 16 to the gate 84. The two pulses produced will have complemented the counter 14 to its three state in which a high level output is still present at its port 98. As with the production of one pulse, the trailing edge of the second pulse will produce a low level signal to gate 78 which will again disable the oscillator from the production of further pulses.

Although the pulses appearing at the output terminal 20 may be used for any purpose, in the preferred embodiment they are used to drive a stepping motor (not shown) of the type described in the above identified patents. These motors have four poles uniformly spaced 90° apart. Under static conditions in which the motor is held against rotation, this geometry indicates that the first two poles to receive a pulse will produce a torque in one direction but the third pole will be more than 180° out of phase with the held rotor and, accordingly, produces a torque in the opposite direction. The torque reversal thus occurs between the second and third steps when the rotor is held. Holding the rotor represents the worst condition of motor loading.

Where the motor is heavily loaded but permitted to turn, the rotor will have moved toward the third pole when that pole receives a pulse. If the rotor has moved more than 90° when the third pole receives a pulse, torque reversal may actually occur when the fourth pole receives a pulse. On the other hand, acceleration of the load may be such that no torque reversal will occur.

To achieve maximum acceleration of the motor, it is desirable to have no torque reversal which would provide a decelerating pull to the motor. Unfortunately, variable loads control whether it is the third or the fourth pulse which may produce the torque reversal and it is therefore unclear whether the third or fourth pulse should be deleted. However, this reasoning indicates that it is at least the third or a later pulse which should be deleted when driving a four pole stepping motor.

It has not been experimentally determined that deletion of the third pulse produces the maximum rate of acceleration for such motors. Accordingly, it is the third step which has been deleted from the initial sequence of pulses by the above described circuit. A similar torque reversal situation exists when it is desired to stop these motors and it has again been experimentally determined that provision of a third pulse with the two preceding pulses deleted produces the maximum deceleration of the motor. Accordingly, the circuit provides the last of the necessary number of pulses in the same place in the sequence from which a pulse was initially deleted. The circuit thus has particular utility for driving stepping motors of the type described in these patents.

It will be appreciated, however, that the principle of the circuit may be used to delete and add pulses in sequences other than the third place in the sequence. Similarly, the circuit may have other uses than for driving stepping motors. For example, in another embodiment of the circuit, the counter 16 may be eliminated and the circuit provide an infinite train of pulses having pulses deleted only from the initial sequence of pulses.

In the above described operation of the circuit it was assumed that the number of pulses called for by the counter 16 exceeded the three pulses necessary to put the counter 14 in its four state. Special cases of circuit operation therefore exist when the counter 16 is set for only one, or two pulses.

Having thus described our invention what we claim as new and desire to secure by Letters Patent of the United States is:

1. Apparatus for generating a pulse train used for driving a stepping motor, said motor being subject to possible torque reversal under certain conditions of acceleration and deceleration comprising:
  A. a pulse generator for supplying a train of pulses suitable for driving a stepping motor;
  B. a control circuit connected to the pulse generator for adjusting the pulse repetition rate of said pulse generator according to a predetermined sequence;
  C. first blanking means responsive to the control circuit for deleting the third pulse occurring after acceleration begins from the pulse train, said pulse occurring at or immediately before the point of possible torque reversal during acceleration;
  D. second blanking means responsive to the control circuit for deleting the third pulse occurring after deceleration begins from the pulse train, said pulse occurring at or immediately before the point of possible torque reversal during deceleration; and
  E. means for allowing the pulse generator to add the number of pulses deleted to the end of the pulse train.

* * * * *